2,935,730
VEHICLE ALARM SYSTEM
Samuel A. Procter, Chicago, Ill.

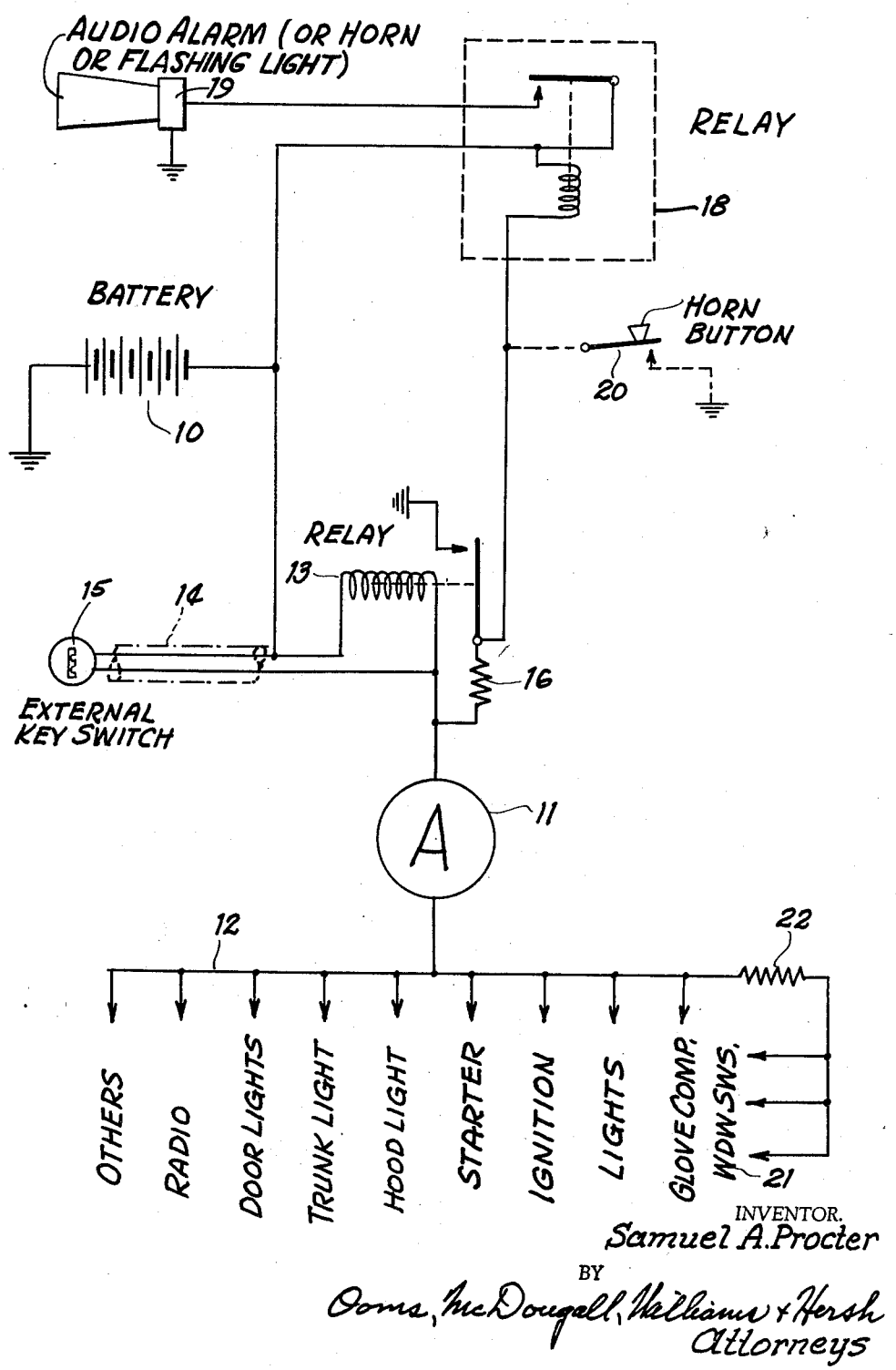

Application August 14, 1957, Serial No. 678,196

6 Claims. (Cl. 340—63)

This invention relates to vehicle alarm systems and is particularly addressed to an alarm system which makes use of a current-sensitive relay wired into the electrical system of a vehicle, such as an automobile or truck, in such manner that it will be actuated by any action on the part of a tamperer which will draw current from the vehicle battery.

My invention offers important advantages over prior-art electric alarm systems for vehicles. For one thing, my invention provides much more extensive protection against unauthorized interference or attempted theft of the vehicle or its contents than do prior-art systems. Furthermore, my invention requires much less apparatus than prior-art systems and can be installed much more readily.

Thus a major object of my invention is to provide a vehicle alarm system which will be actuated by unauthorized opening of the door, the trunk, the glove compartment, or the hood of a conventional automobile without the necessity for installing special control switches at those points.

Another object of the invention is to provide an alarm system which will be actuated by any attempt to start the automobile engine, as by turning on the ignition, actuating the starter button, or turning on the vehicle lights.

A further object of my invention is to provide a vehicle alarm system in which, by installation of simple switches on the window-actuated mechanism, the alarm will be "turned on" whenever any window is opened.

Another important object of my invention is to provide an alarm system for vehicles having an external key switch for sensitizing the alarm, wherein the alarm system will remain in operation even though a would-be tamperer succeeds in cutting the wires leading to the key switch.

Still another object of the invention is to provide an alarm system for vehicles wherein, if desired, the conventional automobile horn may be used as the audio alarm.

Still another object and advantage of the present invention is the provision of an alarm system for vehicles in which the electrical system installed in the vehicle by the manufacturer is made use of as the primary alarm circuit and in which only minor modifications need be made to install the alarm system.

Still other objects and advantages of the invention will appear from the following detailed description of a typical embodiment.

In the single figure of the drawing, I have shown a schematic diagram of a simple embodiment of my invention. As the following description will bring out, various refinements and additional features may be added to the alarm system shown in the drawing while retaining the underlying principle and mode of operation which characterizes my invention.

In the drawing, I show the usual vehicle battery 10, of which one terminal is permanently grounded to the vehicle frame. In the conventional vehicle electrical system, the ungrounded terminal of the battery is connected, usually through an ammeter 11 or other load indicator, to the various electrical devices in the car, such as are symbolically indicated on the drawing by the reference numeral 12. Among these electrical devices are the headlights and taillights, for which a separate manual switch is provided, the ignition circuit, the starter, the radio, and various utility lights such as those which are turned on by the opening of a door, the trunk, or glove compartment. Some of these electrical accessories, such as the radio, are wired to the battery through the same switch which controls the ignition. The starter and the various utility lights, however, are not normally wired through the ignition switch. Specifically, the utility lights all operate upon an opening of the appropriate door or cover, whether or not the ignition switch has been turned on.

In the present invention, I provide a sensitive relay 13 having its coil connected in series with the line running from the ungrounded side of the battery to the junction point from which circuits fan out to the various electrical devices in the car. Connected across the terminals of the coil of relay 13 I provide a pair of leads which run, preferably through an armored cable 14, to a normally closed key switch 15. Key switch 15 may be mounted on a fender, on the cowl, or any other suitable place on the vehicle from which it is accessible from outside the car. Preferably key switch 15 should be provided with a rain cover and should be mounted on a vertical portion of the automobile body, so as to be protected against rain damage.

As heretofore mentioned, key switch 15 is of the normally closed type, in which insertion of the key and actuation of the switch thereby results in opening the circuit between its terminals.

Relay 13 has a pair of contacts, one of which is grounded to the frame of the vehicle as shown. Between the other relay contact and the aforementioned "hot" junction point, I provide a resistor 16. This resistor serves the important function of drawing "holding" current to maintain the relay 13 closed once it has been actuated. Resistor 16 may have any value within a wide range, so long as it is low enough in resistance to draw sufficient current to maintain relay 13 actuated.

From the ungrounded contact of relay 13 I provide a circuit connection to one terminal of the coil of a relay 18, the other terminal of such coil being connected directly to the ungrounded terminal of battery 10. Relay 18 is provided with two contacts, one of which is connected to the ungrounded terminal of battery 10 and the other of which is connected to one terminal of a suitable audible alarm device 19, the other terminal of alarm device 19 being grounded.

Whenever maximum economy of installation is desired, the audible alarm 19 may be the conventional automobile horn, in which case relay 18 may be the usual horn relay. The horn button 20 is shown connected by dotted lines into circuit with the relay 18, indicating that my alarm system may, if desired, be designed to use the horn as an alarm device.

In cases where maximum economy of installation is not necessary, a separate alarm device, such as a loud electric bell, may be employed as audible alarm 19. This procedure is preferable to the use of the automobile horn as an alarm device, since uncontrolled blowing of the horn sometimes occurs accidentally and hence does not attract attention or give alarm as effectively as would a special alarm device such as a bell or siren.

The audible bell or siren used as alarm device 19 may, if desired, be supplemented by a visual alarm, such as a flashing light mounted somewhere inside the vehicle body or elsewhere on the vehicle. If use of the regular vehicle horn as the audible alarm is desired, it may be supplemented with such a flashing light, to call attention to the fact that the sounding horn is due to the work of a tamperer, rather than to a conventional "stuck horn." If this be done, however, it is usually preferable that the flashing-light alarm be actuated by means of a second pair of contacts (not shown) on relay 13, in order that the flashing light will be actuated only in response to operation of relay 13 and not in response to conventional operation of horn button 20.

In normal operation of a vehicle equipped with my alarm system, the key switch 15 is in its normally closed state, so that the coil of relay 13 is short-circuited and hence inoperative. When the operator of the vehicle leaves it unattended, however, he will use his key to actuate switch 15 and hence open the circuit through it. This leaves the automobile with relay 13 connected in the circuit and hence sensitive to any act which will draw current from the vehicle battery.

If, while the owner is away from the vehicle, any unauthorized person opens a door, opens the trunk, opens the glove compartment, opens the hood, attempts to start the car, or turns on the lights, current will be drawn from the vehicle battery and the contacts of relay 13 will immediately close. Upon closure of those contacts, the audible alarm 19 is at once sounded, since the winding of relay 18 is thereby shunted across the battery 10, and the contacts of relay 18 are hence magnetically closed, supplying battery current to the alarm 19. Moreover, the closure of the contacts of relay 13 will start current flowing through the resistor 16, so that the audible alarm 19 will continue to sound even though the tamperer may close the door which he has opened or otherwise attempt to undo the act which touched off the alarm.

In the embodiment shown, the alarm, once started, will continue to sound until the passage of current through the coil of relay 13 is cut off by the closure of switch 15. Normally, this will be accomplished when the owner returns to the vehicle and, with his key, restores switch 15 to its normal closed condition. This will cut off the current through relay 13, open the contacts of the relay, and hence stop the flow of current through resistor 16 and the coil of relay 18.

If a system is desired in which the alarm, once started, continues to sound for only a predetermined period of time, rather than until manual actuation of switch 15, this can be accomplished by wiring into circuit with resistor 16 any of the numerous time-delay devices known to the art. With such an arrangement, the alarm, once actuated, will sound only until after the interval characteristic of the time-delay device has elapsed, unless, of course, the condition which initiated the alarm still exists, in which event the alarm will continue to sound until such condition is eliminated.

If operation of the alarm system is desired only during the period in which the alarm-actuating condition exists, the resistor 16 can be omitted. This variation of the system is not recommended for most installations, however, since an alarm, once started, should continue for at least a substantial period of time, in order that a would-be tamperer will be effectively discouraged from remaining near the vehicle.

It is noteworthy that my alarm system cannot be defeated by cutting through the wires leading to switch 15, since the circuit to that switch is open whenever the alarm system has been activated. Also, a tamperer cannot defeat the system by getting at the relay 13 and short-circuiting its terminals, since access to the relay would require the opening of a door or the raising of the hood, either of which acts will start the alarm sounding.

If the vehicle in question is provided with a hood-light, as most modern vehicles are, the relay 13 may be installed under the hood. If the vehicle has no hood-light, relay 13 should preferably be installed under the vehicle dashboard so as to be inaccessible except after the opening of a door.

In installations where a maximum of protection is desired and economy is not an essential, the windows may be equipped with interlock switches indicated symbolically on the drawing by the legend 21, one side of such switches being grounded and the other side being connected through resistor 22 to the aforementioned junction point of the electrical system. If such interlock switches have been installed, tampering with any window will result in the passage of current through resistor 22, accompanied by sounding of the alarm.

It will be understood that any part of the vehicle for which protection against tampering is desired may be provided with an interlock switch connected in circuit with resistor 22. One of the great advantages of my invention, however, is the fact that nearly all the portions of the vehicle for which protection might be desired are already protected as the result of the utility light built into the vehicle by the manufacturer.

The relay 13 will normally be made sufficiently sensitive to respond to even the small current drawn by a miniature utility bulb such as that installed in the glove compartment. Some vehicles are provided with an electric clock which draws a minute amount of current continuously from the vehicle battery. To prevent the alarm being actuated by this clock current, the relay 13 may be designed so as to be unresponsive to such a small current or, alternatively, the clock may be wired directly to the ungrounded battery terminal so that its current does not pass through the coil of relay 13.

It will of course be understood that the switch 15 need not necessarily be a separate key switch mounted on the vehicle body. If desired, and particularly when the alarm system is being installed at the factory by the vehicle manufacturer, the switch 15 may be incorporated integrally with the door lock, so that the circuit through the switch is opened whenever the door has been locked from the outside with a key.

From the foregoing description of a typical embodiment of my invention, it will be realized that I have provided a vehicle alarm system very much simpler with respect to installation, involving many fewer parts, and affording much broader protection against tampering than has been possible with prior-art electric alarm systems for vehicles.

Since numerous departures from the specific apparatus shown may be made by persons skilled in the art without departing from the spirit of my invention, it is my desire that the scope of my invention be determined primarily by reference to the appended claims.

I claim:

1. In a vehicle having a battery and a plurality of electric load devices including a switch-actuated ignition system, the combination which comprises a current-sensitive means connected in circuit between said battery and said load devices, an alarm device operative responsively to current flowing through said current-sensitive means to one of said load devices, and a switch means connected in shunt with said current-sensitive means normally operative to short-circuit the same, said switch means being manually operable to open such switch means and hence to remove such short circuit.

2. In a vehicle having a battery and a plurality of electric load devices including a switch-actuated ignition system, the combination which comprises a current-sensitive means connected in circuit between said battery and said load devices, an alarm device operative responsively to current flowing through said current-sensitive means to one of said load devices, a switch means connected in shunt with said current-sensitive means normally operative to short-circuit the same, said switch means being manually operable to open such switch means and hence to remove such short circuit, and holding means operative responsively to flow of current through said current-sensitive means to provide a current path through said current-sensitive means and hence to maintain said means actuated, despite cessation of current flow to said load devices.

3. In a vehicle having a battery and a plurality of electric load devices including a switch-actuated ignition system and at least one door-operated electric light, the combination which comprises a current-sensitive element connected in circuit between said battery and said load devices, an alarm device operative responsively to flow of current through said element to one of said load devices, and a key-operated, normally closed switch connected in shunt with said current-sensitive element, said switch being normally operative to short-circuit said element but being manually operable by means of said key to open the circuit therethrough and hence to remove such short circuit.

4. In a vehicle having a battery and a plurality of electric load devices including a switch-actuated ignition system and at least one door-operated electric light, the combination which comprises a current-sensitive element connected in circuit between said battery and said load devices, an alarm device operative responsively to flow of current through said element to one of said load devices, and a key-operated, normally closed switch connected in shunt with said current-sensitive element, said switch being normally operative to short-circuit said element but being manually operable by means of said key to open the circuit therethrough and hence to remove such short circuit, said key-operated switch being mounted on said vehicle for access externally thereof.

5. In a vehicle having a battery, a plurality of electric load devices including a switch-actuated ignition system and at least one door-operated electric light, said vehicle having also a horn, the combination which comprises a current-sensitive relay connected in circuit between said battery and said load devices, circuit means connecting said relay to said horn operative to sound said horn responsively to passage of current through said relay to one of said load devices, and a switch means connected in shunt with said relay normally operative to short-circuit said relay, said switch means being manually operable to open the circuit therethrough and hence to remove such short circuit from said relay.

6. The apparatus of claim 5 wherein said switch means comprises a key-operated switch mounted on said vehicle for access externally thereof.

References Cited in the file of this patent

UNITED STATES PATENTS

| | | |
|---|---|---|
| 1,964,355 | Hovey | June 26, 1934 |
| 2,098,644 | Gleason | Nov. 9, 1937 |
| 2,238,246 | Chapel | Apr. 15, 1941 |
| 2,419,957 | Laford | May 6, 1947 |
| 2,594,196 | Moledzky | Apr. 22, 1952 |
| 2,607,837 | Federuk | Aug. 19, 1952 |
| 2,693,588 | Dawley | Nov. 2, 1954 |